United States Patent
Yu et al.

(10) Patent No.: US 11,591,525 B2
(45) Date of Patent: Feb. 28, 2023

(54) METHOD FOR ANAEROBICALLY CRACKING POWER BATTERY

(71) Applicants: GUANGDONG BRUNP RECYCLING TECHNOLOGY CO., LTD., Foshan (CN); HUNAN BRUNP RECYCLING TECHNOLOGY CO., LTD., Changsha (CN); HUNAN BRUNP EV RECYCLING CO., LTD., Changsha (CN)

(72) Inventors: Haijun Yu, Foshan (CN); Ting Peng, Foshan (CN); Yinghao Xie, Foshan (CN); Xuemei Zhang, Foshan (CN)

(73) Assignee: GUANGDONG BRUNP RECYCLING TECHNOLOGY CO., LTD., Changsha (CN)

( * ) Notice: Subject to any disclaimer, the term of this patent is extended or adjusted under 35 U.S.C. 154(b) by 428 days.

(21) Appl. No.: 16/922,176

(22) Filed: Jul. 7, 2020

(65) Prior Publication Data
US 2021/0380886 A1 Dec. 9, 2021

(30) Foreign Application Priority Data
Jun. 9, 2020 (CN) .......................... 2020105184613

(51) Int. Cl.
*C10G 1/00* (2006.01)
*B01J 23/889* (2006.01)
(Continued)

(52) U.S. Cl.
CPC ............ *C10G 1/00* (2013.01); *B01J 23/8892* (2013.01); *B01J 37/04* (2013.01); *B01J 37/10* (2013.01);
(Continued)

(58) Field of Classification Search
CPC .............. C10G 1/00; C10G 2300/1003; B01J 23/8892; B01J 37/04; B01J 37/10;
(Continued)

(56) References Cited

FOREIGN PATENT DOCUMENTS

CN 105742743 A * 7/2016
CN 108941162 A * 12/2018

OTHER PUBLICATIONS

Farzana, Rifat, et al. "Selective synthesis of CuNi alloys using waste PCB and NiMH battery." Journal of environmental management 234 (2019): 145-153. (Year: 2019).*

(Continued)

*Primary Examiner* — Sarah A. Slifka
*Assistant Examiner* — Aaron J Salter
(74) *Attorney, Agent, or Firm* — Grogan, Tuccillo & Vanderleeden, LLP

(57) ABSTRACT

Disclosed is a method for anaerobically cracking a power battery, which includes the following steps: disassembling a waste power battery to obtain a battery cell; taking out a diaphragm from the battery cell for later use, and pyrolyzing the battery cell to obtain electrode powder; extracting nickel, cobalt and manganese elements from the electrode powder with an extraction buffer, filtering, taking the filtrate, then adjusting the filtrate with a nickel solution, a cobalt solution and a manganese solution to obtain a solution A, adding the solution A dropwise into ammonium hydroxide under stirring, and then adding an alkali solution under stirring to obtain a solution B; subjecting the solution B to a hydrothermal reaction, filtering, and roasting to obtain a catalyst, such that a chemical formula of the catalyst is $Ni^{2+}_{1-x-y}Co^{2+}_{x}Mn^{2+}_{y}O$, where $0.25 \leq x < 0.45$, $0.25 \leq y < 0.45$.

10 Claims, 2 Drawing Sheets

(51) Int. Cl.
- *B01J 37/04* (2006.01)
- *B01J 37/10* (2006.01)
- *H01M 10/54* (2006.01)
- *H01M 10/052* (2010.01)
- *B29B 17/04* (2006.01)
- *H01M 6/52* (2006.01)
- *C22B 7/00* (2006.01)
- *C22B 3/00* (2006.01)
- *C22B 47/00* (2006.01)
- *B29B 17/02* (2006.01)

(52) U.S. Cl.
CPC .......... *B29B 17/02* (2013.01); *B29B 17/0404* (2013.01); *C22B 7/006* (2013.01); *C22B 23/04* (2013.01); *C22B 47/00* (2013.01); *H01M 6/52* (2013.01); *H01M 10/052* (2013.01); *H01M 10/54* (2013.01); *B29B 2017/0468* (2013.01); *B29B 2017/0484* (2013.01); *C10G 2300/1003* (2013.01); *H01M 2220/20* (2013.01); *Y02P 10/20* (2015.11); *Y02W 30/84* (2015.05)

(58) Field of Classification Search
CPC ............ B29B 17/02; B29B 2017/0468; B29B 2017/0484; B29B 17/0404; C22B 7/006; C22B 23/04; C22B 47/00; H01M 6/52; H01M 10/052; H01M 10/54; H01M 2220/20; Y02W 30/84
See application file for complete search history.

(56) References Cited

OTHER PUBLICATIONS

English machine translation of Guo et al. (CN 105742743 A) (Year: 2016).*

Guo, Mingming, et al. "Manganese-based multi-oxide derived from spent ternary lithium-ions batteries as high-efficient catalyst for VOCs oxidation." Journal of hazardous materials 380 (2019): 120905. (Year: 2019).*

English machine translation of Ju et al. (CN 108941162 A) (Year: 2018).*

* cited by examiner

METHOD FOR ANAEROBICALLY CRACKING POWER BATTERY

CROSS REFERENCE TO RELATED APPLICATION

This application claims priority to Chinese Patent Application No. 2020105184613, filed on Jun. 9, 2020, which is hereby incorporated by reference in its entirety.

TECHNICAL FIELD

The present disclosure belongs to the field of lithium ion batteries, and in particular to a method for anaerobically cracking a power battery.

BACKGROUND OF INVENTION

Currently, decommissioned power batteries are growing vastly, and large-scale full-component recycling is extremely urgent. However, the harmless treatment of three typical organic substances in the decommissioned power batteries has always affected the efficiency of full-component metal recycling. Currently, all around the world, it also seriously affects the clean production and secondary environmental protection of the recycling industry, and especially the traditional incineration and pyrolysis methods are difficult to reach the clean production and ultra-low emission environmental standards, which is the common key problem of the battery recycling industry.

In recent years, China's new energy vehicles have developed rapidly. By 2020, the annual output of the new energy vehicles will exceed 2 million vehicles, and the cumulative production and sales volume will exceed 5 million vehicles. With the increase of daily use times and service life of a new energy vehicle, various performances of a power battery for the vehicle are gradually attenuated. According to the international general battery standards, in order to ensure the daily driving safety of a vehicle, when the performance of a power battery pack is attenuated to 80% of the original power battery, it must be decommissioned and replaced. However, the decommissioned battery needs to be recycled to realize its value better.

The decommissioned power battery contains many kinds of organic substances. As the number of decommissioned power batteries is increased, irreversible environmental pollution is caused since the organic substances in the decommissioned power batteries are not properly disposed and utilized to maximize their values. A traditional incineration technology can use the exhaust heat of incineration to generate electricity. However, improper treatment of the tail gas after incineration will greatly pollute the air and soil. Both the tail gas and soot after the incineration contain toxic substances, which need to be discharged after special treatment. The treatment cost is high, and the investment cost is high. Ordinary pyrolysis does not carry out gradient control of the temperature, and thus valuable substances generated in the pyrolysis process of organic substances cannot be classified and recycled. At the same time, since temperature control cannot be carried out according to the temperature properties of the organic substances, the pyrolysis time is prolonged, and the energy consumption is increased, which is not conducive to cost saving.

The traditional cracking of an organic polymer material is to preheat waste plastics to a molten state in sections, and remove HCl generated in the preheating process with lime, such as that disclosed in "PROCESS AND DEVICE FOR OIL REFINING BY CRACKING WASTE PLASTICS" (CN201610156147.9). However, such traditional recycling manner cannot effectively recycle a plastic diaphragm in a lithium ion battery, and does not fully recycle other parts of the battery, resulting in waste of resources. This technology is relatively backward.

SUMMARY OF INVENTION

An objective of the present disclosure is to provide a method for anaerobically cracking a power battery. The method adopts an anaerobic catalytic cracking manner to degrade a waste diaphragm in a lithium battery with high efficiency, and the products are C1-C4 and C5-C10 micromolecular organic substances of industrial utilization values.

In order to achieve the aforementioned objective, the present disclosure adopts the following technical solution:

A method for anaerobically cracking a power battery includes the following steps:

(1) disassembling a waste power battery in sequence to obtain a battery cell and a metal shell, respectively;

(2) taking out a diaphragm from the battery cell, cleaning the diaphragm for later use, and pyrolyzing the remaining battery cell to obtain electrode powder;

(3) extracting nickel, cobalt and manganese elements from the electrode powder with an extraction buffer, filtering, taking the filtrate, then adjusting the filtrate with a nickel solution, a cobalt solution and a manganese solution to obtain a solution A, adding the solution A dropwise into ammonium hydroxide under stirring, and then adding an alkali solution under stirring to obtain a solution B;

(4) subjecting the solution B to a hydrothermal reaction, filtering, baking and roasting to obtain a catalyst of $Ni_{2+1-x-y}Co_{2+x}Mn_{2+y}O$;

(5) soaking the diaphragm in the step (2) with a solvent, subjecting to vacuum treatment, crushing and grinding to obtain powder; and (6) mixing and reacting the powder with the catalyst in the step (4) to obtain C1-C4 and C5-C10 micromolecular organic substances, wherein a chemical formula of the catalyst of step (4) is $Ni_{2+1-x-y}Co_{2+x}Mn_{2+y}O$, where $0.25 \leq x < 0.45$, $0.25 \leq y < 0.45$.

Preferably, the pyrolyzing in the step (2) is conducted at a temperature of 400° C.-600° C. for 2-8 h in a vacuum environment.

Preferably, the extraction buffer in the step (3) is one of a mixed solution of nitric acid and an oxidant, or hydrochloric acid.

More preferably, the oxidant is at least one of hydrogen peroxide, potassium peroxide, sodium hypochlorite or potassium hypochlorite.

More preferably, the mass ratio of the mixed solution, hydrochloric acid and water in the extraction buffer is (1-3):(1-3):1.

Preferably, the mass ratio of the electrode powder to the extraction buffer in the step (3) is 1:(1-3).

Preferably, the contents of nickel, cobalt and manganese are determined before the process of adjusting the filtrate in the step (3).

More preferably, the titration method used for determining the contents of nickel, cobalt and manganese is one of a dimethylglyoxime gravimetric method, a potentiometric titration method or an EDTA titration method.

Preferably, the nickel solution, the cobalt solution and the manganese solution in the step (3) are at least one of nitrate, hydrochloride or sulfate of nickel, cobalt and manganese.

Preferably, the molar ratio of nickel, cobalt and manganese in the solution A in the step (3) is 1:(0.5-3):(0.5-3).

Preferably, the total concentration of nickel, cobalt and manganese in the solution A in the step (3) is 2-6 mol/L.

Preferably, the volume ratio of the solution A to ammonium hydroxide in the step (3) is 1:(3-7).

Preferably, the ammonium hydroxide in the step (3) has a concentration of 0.2-0.8 mol/L.

Preferably, the alkali solution in the step (3) is NaOH at a concentration of 2-6 mol/L.

Preferably, the hydrothermal reaction in the step (4) is conducted at a temperature of 100° C.-150° C. for 2-6 hours.

Preferably, the baking in the step (4) is conducted at a temperature of 60° C.-80° C. for 4-24 hours.

Preferably, the roasting in the step (4) is conducted at a temperature of 450° C.-500° C. under an atmosphere of nitrogen for 1-2 hours.

Preferably, the mass ratio of the diaphragm to the solvent in the step (5) is 1:(0.4-0.8).

Preferably, the solvent in the step (5) is amyl acetate.

Preferably, the soaking in the step (5) is conducted at a temperature of 70° C.-80° C. for 12-24 hours.

Preferably, the vacuum treatment in the step (5) is conducted at a temperature of 80° C.-120° C. for 30-120 min.

Preferably, the mass ratio of the powder to the catalyst in the step (6) is 1:(200-240).

Preferably, the reaction in the step (6) is conducted at a temperature of 400° C.-700° C. for 4-8 h.

Preferably, the C1-C4 and C5-C10 micromolecular organic substances in the step (6) are saturated or unsaturated hydrocarbons with carbon chains of 1-10 carbons.

More preferably, the C1-C4 and C5-C10 micromolecular organic substances are gaseous hydrocarbons such as methane, ethane, ethylene, propylene, butylene, etc., or liquid hydrocarbons such as pentane, pentene, ethane, hexene, etc.

Preferably, after the reaction, the step (3) further includes recycling the catalyst by pyrolyzing the reacted catalyst, and extracting it with the extraction buffer.

More preferably, the extraction buffer is one of a mixed solution of nitric acid and an oxidant, or hydrochloric acid.

More preferably, the oxidant is at least one of hydrogen peroxide, potassium peroxide, sodium hypochlorite or potassium hypochlorite.

More preferably, the mass ratio of the mixed solution, hydrochloric acid and water in the extraction buffer is (1-3):(1-3):1.

Beneficial Effects

1. In the present disclosure, the waste diaphragm in a lithium battery is degraded by means of anaerobic catalytic cracking with high efficiency, and the product is micromolecular organic substances of industrial utilization values; furthermore, the environmental pollution caused by the discarded lithium battery diaphragm is effectively avoided since only nitrogen is consumed in the catalytic degradation process. If the diaphragm is simply recycled, it may be mixed with multiple macromolecular polymers and may be damaged, and thus its recovery value is not high. Further, the diaphragm after degradation may be used as combustible gas to serve as an energy source on one hand and as an industrial raw material on the other hand.

2. The method of the present disclosure uses amyl acetate as a solvent to destroy the mechanical strength of a linear polymer and increase the brittleness of the polymer through swelling action, such that it is easier to crush and grind the polymer into powder with a smaller particle size. This makes the reactants better contact with the catalyst, and thus the catalytic effect is better. Furthermore, the swelling action can also destroy the binding force between molecules, such that the molecules are easier to be adsorbed and activated by the catalyst.

3. In the present disclosure, a waste battery anode material is used as the raw material to prepare the catalyst, and then the catalyst is utilized to catalyze the degradation of the diaphragm, and the catalyst can still be recycled for catalyzing again.

DETAILED DESCRIPTION

Figure 1:
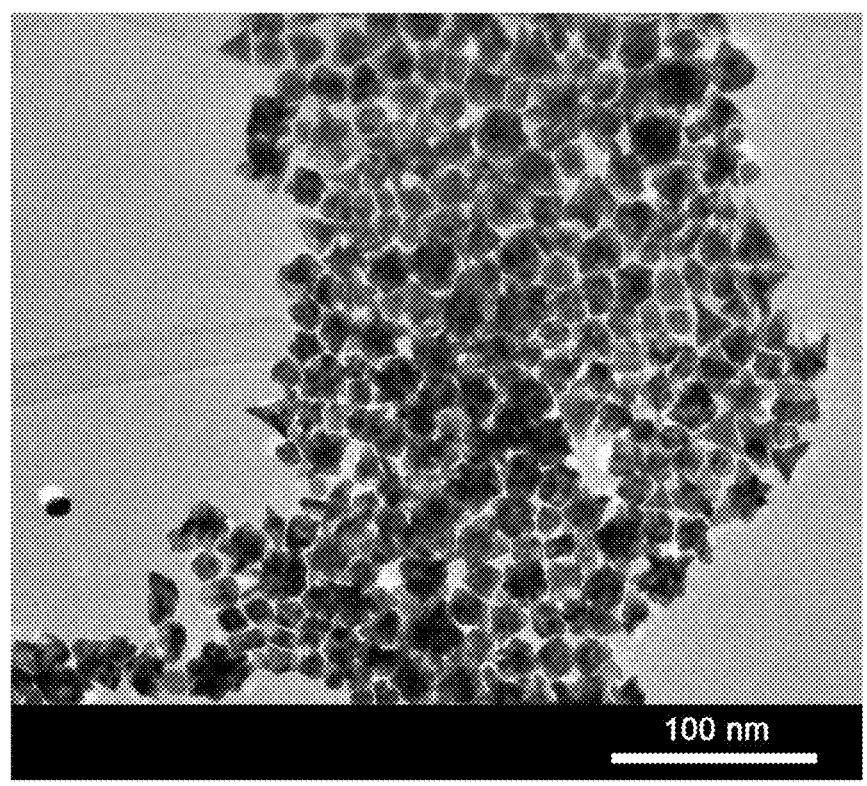
FIG. 1 is an SEM image of a catalyst prepared in Example 2.

In order to enable those skilled in the art to understand the technical solution of the present disclosure more clearly, the following examples are listed for illustration. It should be pointed out that, the following examples do not limit the claimed scope of the present disclosure.

Unless otherwise specified, the raw materials, reagents or devices used in the following examples can be obtained through conventional commercial approaches or by existing known methods.

Example 1

The method for anaerobically cracking a power battery of this example includes the following specific steps:

(1) a waste power battery was discharged and disassembled in sequence to obtain a battery cell and a metal shell, respectively;

(2) a diaphragm was taken out from the battery cell, washed with deionized water until no attachment visible to the naked eyes was found, and the remaining battery cell was pyrolyzed under an atmosphere of vacuum and at a temperature of 500° C. for 4 h to obtain electrode powder;

(3) nickel, cobalt and manganese elements were extracted from the electrode powder with an extraction buffer (with the molar ratio of water, hydrochloric acid and hydrogen peroxide of 1:1:1) according to a solid-to-liquid ratio of 1:3, a current collector was directly recovered, the solution was filtered, the filter residue was removed, the filtrate was measured for the contents of nickel, cobalt and manganese respectively by a dimethylglyoxime gravimetric method, a potentiometric titration method and an EDTA titration method, 10 mL of the filtrate was adjusted with a nickel solution, a cobalt solution and a manganese solution (each with a concentration of 4 mol/L) respectively until the molar ratio of nickel, cobalt and manganese in the filtrate was 1:0.5:0.5, so as to obtain a solution A (the total concentration of the three elements of nickel, cobalt and manganese was 2 mol/L), the solution A was added dropwise into aqueous ammonia of a concentration of 0.2 mol/L at a volume ratio of 1:3, and stirred for 5 min at the same time at a rotation speed of 50 r/min, then added with a 2 mol/L NaOH solution at a proportion of 0.1 mL, and stirred at the original rotation speed for 5 min to obtain a solution B;

(4) the solution B was put into a polytetrafluoroethylene reaction kettle for a hydrothermal reaction at 100° C. for 2 hours, the precipitate was filtered, and the filter residue was washed with deionized water for 3 times, baked at 60° C. for 4 hours, and then roasted at 450° C. under a nitrogen atmosphere for 1 hour to obtain a catalyst of $Ni^{2+}_{0.5}Co^{2+}_{0.25}Mn^{2+}_{0.25}O$;

(5) the diaphragm in the step (2) was soaked with amyl acetate (soaked according to a solid-to-liquid ratio of 1:0.4 at 70° C. for 12 hours), then subjected to vacuum treatment under a vacuum condition at 80° C. for 30 min, crushed, and ground into powder; and (6) the powder was mixed with the catalyst $Ni^{2+}_{0.5}Co^{2+}_{0.25}Mn^{2+}_{0.25}O$ obtained in the step (4) uniformly at a mass ratio of 200:1, and placed into a high-pressure reactor, the reactor was vacuumized, nitrogen was introduced into the reactor, and a reaction was carried out at 400° C. under a nitrogen atmosphere for 4 h to obtain micromolecular organic substances, and then the reacted catalyst was pyrolyzed, extracted with the extraction buffer and recycled.

Example 2

The method for anaerobically cracking a power battery of this example includes the following specific steps:

(1) a waste power battery was discharged and disassembled in sequence to obtain a battery cell and a metal shell, respectively, wherein the metal shell was directly recycled;

(2) a diaphragm was taken out from the battery cell, washed with deionized water until no attachment visible to the naked eyes was found, and the remaining battery cell was pyrolyzed under vacuum and at a temperature of 500° C. for 4 h to obtain electrode powder;

(3) nickel, cobalt and manganese elements were extracted from the electrode powder with an extraction buffer (with the molar ratio of water, hydrochloric acid and hydrogen peroxide of 1:2:2) according to a solid-to-liquid ratio of 1:3, a current collector was directly recovered, the solution was filtered, the filter residue was removed, the filtrate was measured for the contents of nickel, cobalt and manganese respectively by a dimethylglyoxime gravimetric method, a potentiometric titration method and an EDTA titration method, 250 mL of the filtrate was adjusted with a nickel solution, a cobalt solution and a manganese solution (each with a concentration of 6 mol/L) respectively until the molar ratio of nickel, cobalt and manganese in the filtrate was 1:2:2, so as to obtain a solution A (the total concentration of the three elements of nickel, cobalt and manganese was 4 mol/L), the solution A was added dropwise into aqueous ammonia of a concentration of 0.5 mol/L at a volume ratio of 1:5, and stirred at a rotation speed of 500 r/min for 30 min, then added with a 4 mol/L NaOH solution at a proportion of 20 mL, and stirred at a rotation speed of 500 r/min for 5 min to obtain a solution B;

(4) the solution B was put into a polytetrafluoroethylene reaction kettle for a hydrothermal reaction at 120° C. for 4 hours, the precipitate was filtered, and the filter residue was washed with deionized water for 5 times, baked at 70° C. for 14 hours, and then roasted at 480° C. under a nitrogen atmosphere for 1.5 hour to obtain a catalyst of $Ni^{2+}_{0.2}Co^{2+}_{0.4}Mn^{2+}_{0.4}O$;

(5) the diaphragm was soaked with amyl acetate according to a solid-to-liquid ratio of 1:0.6 at 75° C. for 18 hours, then subjected to treatment under a vacuum condition at 100° C. for 80 min, crushed, and ground into powder; and (6) the powder was mixed with the catalyst $Ni^{2+}_{0.2}Co^{2+}_{0.4}Mn^{2+}_{0.4}O$ obtained in the step (4) uniformly at a mass ratio of 200:1, and placed into a high-pressure reactor, the reactor was vacuumized, nitrogen was introduced into the reactor, and a reaction was carried out at 550° C. under a nitrogen atmosphere for 6 h to obtain micromolecular organic substances, and then the reacted catalyst was pyrolyzed, extracted with the extraction buffer and recycled.

Example 3

The method for anaerobically cracking a power battery of this example includes the following specific steps:

(1) a waste power battery was discharged and disassembled in sequence to obtain a battery cell and a metal shell, respectively, wherein the metal shell was directly recycled;

(2) a diaphragm was taken out from the battery cell, washed with deionized water until no attachment visible to the naked eyes was found, and the remaining battery cell was pyrolyzed under vacuum and at a temperature of 500° C. for 4 h to obtain electrode powder;

(3) nickel, cobalt and manganese elements were extracted from the electrode powder with an extraction buffer (with the molar ratio of water, hydrochloric acid and hydrogen peroxide of 1:3:3) according to a solid-to-liquid ratio of 1:3, a current collector was directly recovered, the solution was filtered, the filter residue was removed, the filtrate was measured for the contents of nickel, cobalt and manganese respectively by a dimethylglyoxime gravimetric method, a potentiometric titration method and an EDTA titration method, 500 mL of the filtrate was adjusted with a nickel solution, a cobalt solution and a manganese solution (each with a concentration of 6 mol/L) respectively until the molar ratio of nickel, cobalt and manganese in the filtrate was 1:3:3, so as to obtain a solution A (the total concentration of the three elements of nickel, cobalt and manganese was 6 mol/L), the solution A was added dropwise into aqueous ammonia of a concentration of 0.8 mol/L at a volume ratio of 1:7, and stirred at a rotation speed of 1000 r/min for 60 min, then added with a 6 mol/L NaOH solution at a proportion of 45 mL, and stirred at a rotation speed of 1000 r/min for 30 min to obtain a solution B;

(4) the solution B was put into a polytetrafluoroethylene reaction kettle for a hydrothermal reaction at 150° C. for 6 hours, the precipitate was filtered, and the filter residue was washed with deionized water for 7 times, baked at 80° C. for 24 hours, and then roasted at 500° C. under a nitrogen atmosphere for 2 hour to obtain a catalyst of $Ni^{2+}_{0.142}Co^{2+}_{0.429}Mn^{2+}_{0.429}O$;

(5) the diaphragm was soaked with amyl acetate according to a solid-to-liquid ratio of 1:0.8 at 80° C. for 24 hours, then subjected to treatment under a vacuum condition at 120° C. for 120 min, crushed, and ground into powder; and (6) the powder was mixed with the catalyst $Ni^{2+}_{0.142}Co^{2+}_{0.429}Mn^{2+}_{0.429}O$ obtained in the step (4) uniformly at a mass ratio of 200:1, and placed into a high-pressure reactor, the reactor was vacuumized, nitrogen was introduced into the reactor, and a reaction was carried out at 700° C. under a nitrogen atmosphere for 8 h to obtain micromolecular organic substances, and then the reacted catalyst was pyrolyzed, extracted with the extraction buffer and recycled.

Comparative Example 1 (CN108941162A)

A process of anaerobically cracking, recycling and sorting a lithium battery includes the following steps:

Step 1: the lithium battery was fed into a crusher for crushing;

Step 2: the lithium battery was crushed by the crusher, and conveyed to an air separator through a conveying device;

Step 3: metal blocks and plastic shells with larger specific gravity were sorted out by the air separator, and a mixed material of positive and negative plates, diaphragms and plastics with smaller specific gravity was conveyed into a high-temperature anaerobic cracking furnace through the conveying device after vacuumizing, wherein the temperature of the high-temperature anaerobic cracking furnace was higher than 300° C., the high-temperature anaerobic cracking furnace was vacuumized and kept closed before the mixed material was added into it, the conveying device kept a vacuum state during the conveying process, the plastics and diaphragms doped in the mixed material were cracked to generate a combustible gas, and the combustible gas was discharged and collected, and only positive and negative plates and a small amount of metals were left in the cracked mixed material;

Step 4: the positive and negative plates were fed into a high-speed decomposition machine, the positive and negative plates were crushed into powder again by the high-speed decomposition machine for decomposition and separation, and the materials were decomposed into metal particles with larger particle sizes and positive and negative electrode powder with smaller particle sizes by the decomposition machine;

Step 5: the decomposed and separated materials entered a cyclone collector through negative pressure, and the collected positive and negative electrode powder was subjected to aggregation by the cyclone collector through a dust collecting system equipped with a fan, such that the positive and negative electrode powder was collected by the dust collecting system;

Step 6: after the collection through the cyclone collector, the remaining material of coarse particles was screened by a screening device, so as to screen out positive and negative electrode power, copper-aluminum mixtures and large metal particles with increasing particle sizes respectively;

Step 7: the metal mixture as screened out was subjected to screening and grading and multiple times of sorting according to specific gravity, so as to separate copper and aluminum with different specific gravities; and Step 8: the obtained positive and negative electrode powder, metals and plastics were classified.

Figure 2:
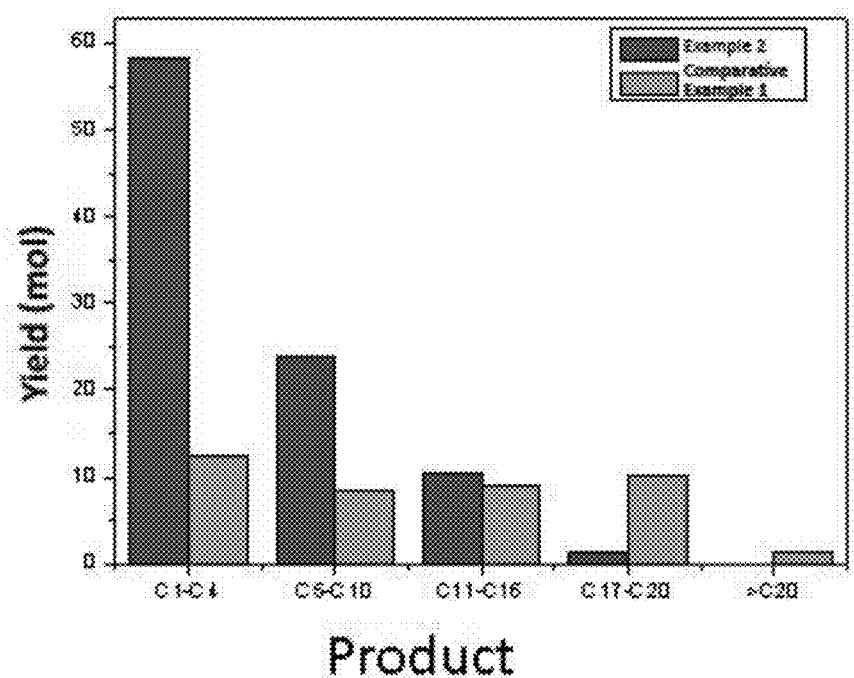
FIG. 2 is a graph comparing the yields of micromolecular organic substances prepared in Example 2 and Comparative Example 1.
Figure 3:
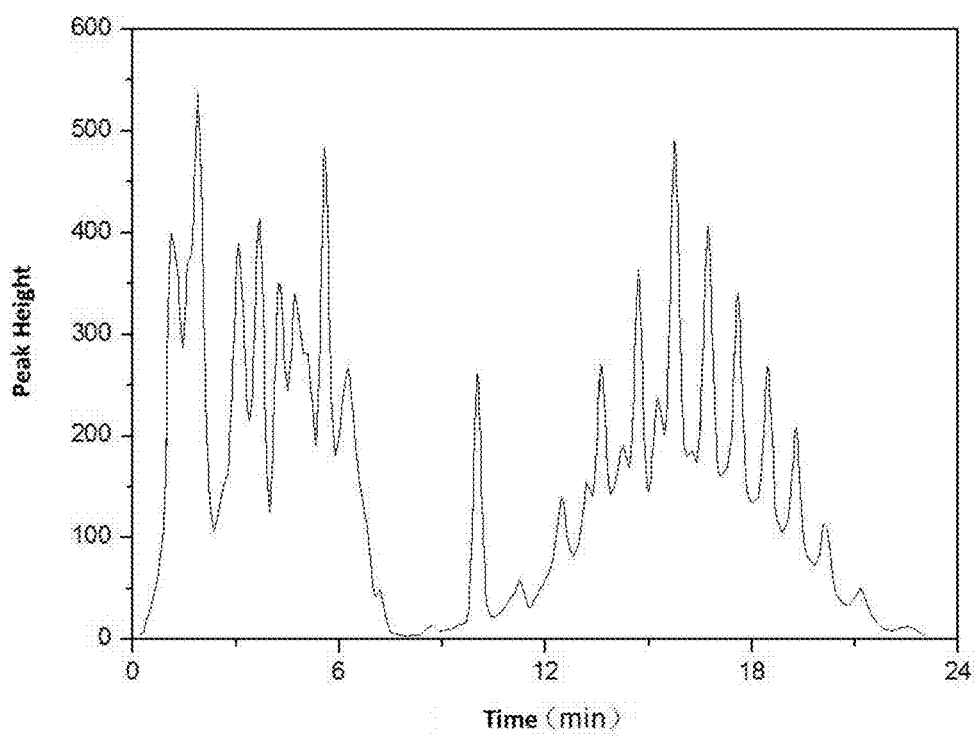
FIG. 3 is a gas chromatography detection diagram of the micromolecular organic substance prepared in Example 2.

Comparison of Degradation Effects:

Anaerobic cracking was carried out according to the aforementioned Example 2 and Comparative Example 1, respectively, and the obtained products were detected by gas chromatography. The yield results are shown in FIG. 2. As could be seen from FIG. 2, for the product in the Comparative Example 1, the yield of the micromolecular products of C1-C10 is relatively low, while the yield of the macromolecular products of C11 and above is relatively high. On the contrary, in the Example 2, the yield of micromolecular products of C1-C4 and C5-C10 is relatively high, while the yield of macromolecular products is relatively low. The gas chromatography detection results are shown in FIG. 3. Therefore, it shows that the anaerobic cracking effect of the Example 2 is better than that of the Comparative Example 1, and the products are micromolecular organic substances of industrial utilization values. The simply recycled diaphragm of the Comparative Example 1 is a mixture of multiple macromolecular polymers and might be damaged, and thus its recovery value is not high. However, in the present disclosure, the diaphragm after degradation on one hand can be used as combustible gas to serve as an energy source, and on the other hand can be used as an industrial raw material.

The method for anaerobically cracking the power battery as provided by the present disclosure has been described in detail above. The principle and implementation of the present disclosure have been described by applying specific embodiments herein. The description of the above embodiments is only used for facilitating understanding of the method of the present disclosure and the core idea thereof, including the best mode, and also enables any person skilled in the art to practice the present disclosure, including manufacturing and using any device or system, and implementing any combined method. It should be noted that, several improvements and modifications may be made by persons of ordinary skill in the art without departing from the principle of the present disclosure, and these improvements and modifications should also be considered within the protection scope of the present disclosure. The claimed scope of the present disclosure is defined by the claims, and may include other embodiments that can come into the minds of those skilled in the art. If these other embodiments have structural elements that are not different from those recited by the literal language of the claims, or if they include equivalent structural elements that are not materially different from those recited by the literal language of the claims, then these other embodiments should also be included within the scope of the claims.

What is claimed is:

1. A method for anaerobically cracking a power battery, comprising:
    (1) disassembling a waste power battery in sequence to obtain a battery cell and a metal shell, respectively;
    (2) taking out a diaphragm from the battery cell, cleaning the diaphragm for later use, and pyrolyzing the battery cell to obtain electrode powder;
    (3) extracting nickel, cobalt and manganese elements from the electrode powder with an extraction buffer, filtering, taking the filtrate, then adjusting the filtrate with a nickel solution, a cobalt solution and a manganese solution to obtain a solution A, adding the solution A dropwise into ammonium hydroxide under stirring, and then adding an alkali solution under stirring to obtain a solution B;
    (4) subjecting the solution B to a hydrothermal reaction, filtering, baking and roasting to obtain a catalyst;
    (5) soaking the diaphragm in the step (2) with a solvent, subjecting to vacuum treatment, crushing and grinding to obtain powder; and
    (6) mixing and reacting the powder with the catalyst in the step (4) to obtain C1-C4 and C5-C10 micromolecular organic substances;

wherein a chemical formula of the catalyst of step (4) is $Ni^{2+}_{1-x-y}Co^{2+}_{x}Mn^{2+}_{y}O$, where $0.25 \leq x < 0.45$, $0.25 \leq y < 0.45$.

2. The method of claim 1, wherein the pyrolyzing in the step (2) is conducted at a temperature of 400° C.-600° C. for 2-8 h in a vacuum environment.

3. The method of claim 1, wherein the extraction buffer in the step (3) is one of a mixed solution of nitric acid and an oxidant, or hydrochloric acid; and the oxidant is at least one of hydrogen peroxide, potassium peroxide, sodium hypochlorite or potassium hypochlorite.

4. The method of claim 1, wherein the nickel solution, the cobalt solution and the manganese solution in the step (3) are at least one of nitrate, hydrochloride or sulfate of nickel, cobalt and manganese.

5. The method of claim 1, wherein the molar ratio of nickel, cobalt and manganese in the solution A in the step (3) is 1:(0.5-3):(0.5-3).

6. The method of claim 1, wherein the hydrothermal reaction in the step (4) is conducted at a temperature of 100° C.-150° C. for 2-6 hours.

7. The method of claim 1, wherein the roasting in the step (4) is conducted at a temperature of 450° C.-500° C. under an atmosphere of nitrogen for 1-2 hours.

8. The method of claim 1, wherein the solvent in the step (5) is amyl acetate.

9. The method of claim 1, wherein the vacuum treatment in the step (5) is conducted at a temperature of 80° C.-120° C. for 30-120 min.

10. The method of claim 1, wherein the reaction in the step (6) is conducted at a temperature of 400° C.-700° C. for 4-8 h.

\* \* \* \* \*